(12) United States Patent
Yamamoto et al.

(10) Patent No.: US 12,235,125 B2
(45) Date of Patent: Feb. 25, 2025

(54) MAP DATA AND MAP DATA GENERATION METHOD

(71) Applicant: Aichi Steel Corporation, Tokai (JP)

(72) Inventors: Michiharu Yamamoto, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 393 days.

(21) Appl. No.: 17/778,020

(22) PCT Filed: Nov. 20, 2020

(86) PCT No.: PCT/JP2020/043478
§ 371 (c)(1),
(2) Date: May 19, 2022

(87) PCT Pub. No.: WO2021/100866
PCT Pub. Date: May 27, 2021

(65) Prior Publication Data
US 2022/0412769 A1    Dec. 29, 2022

(30) Foreign Application Priority Data
Nov. 22, 2019   (JP) .................................. 2019-211865

(51) Int. Cl.
*G01C 21/00*    (2006.01)
*B60W 60/00*    (2020.01)
*G08G 1/042*    (2006.01)

(52) U.S. Cl.
CPC ....... *G01C 21/3815* (2020.08); *B60W 60/001* (2020.02); *G01C 21/3841* (2020.08);
(Continued)

(58) Field of Classification Search
CPC ............ G01C 21/3815; G01C 21/3841; G01C 21/3878; B60W 60/001; B60W 2556/40; G08G 1/042
See application file for complete search history.

(56) References Cited

U.S. PATENT DOCUMENTS

| 6,378,772 B1 * | 4/2002 | Yonemura | ........ G08G 1/096758 235/449 |
| 2002/0065600 A1 * | 5/2002 | Oka | ........ G08G 1/042 340/988 |

(Continued)

FOREIGN PATENT DOCUMENTS

| EP | 3418845 A1 | 12/2018 |
| JP | H09-292236 A | 11/1997 |

(Continued)

OTHER PUBLICATIONS

Extended European search report issued on Nov. 13, 2023, in corresponding European patent Application No. 20889467.5, 12 pages.

(Continued)

*Primary Examiner* — Manuel A Rivera Vargas
(74) *Attorney, Agent, or Firm* — XSENSUS LLP

(57) ABSTRACT

A map (1) to be used by a vehicle which can measure magnetism acting from a road surface side forming a surface of a road to estimate an own vehicle position includes a structure map (M1) which represents a road structure and has position data indicating an absolute position linked to each point and a road-surface magnetic distribution (M2) which is magnetic data at each point on the road surface and has position data indicating an absolute position linked to each point. In the map (1), the structure map (M1) and the road-surface magnetic distribution (M2) are associated with each other via the position data indicating the absolute position.

20 Claims, 17 Drawing Sheets

(52) U.S. Cl.
CPC ......... *G01C 21/3878* (2020.08); *G08G 1/042* (2013.01); *B60W 2556/40* (2020.02)

(56) References Cited

U.S. PATENT DOCUMENTS

| | | | | |
|---|---|---|---|---|
| 2002/0143442 | A1* | 10/2002 | Uehara | G01C 21/28 |
| | | | | 318/587 |
| 2020/0012294 | A1 | 1/2020 | Yamamoto et al. | |
| 2020/0133299 | A1 | 4/2020 | Yamamoto et al. | |
| 2020/0332483 | A1 | 10/2020 | Michiharu et al. | |
| 2020/0340825 | A1 | 10/2020 | Yamamoto et al. | |
| 2021/0101497 | A1* | 4/2021 | Schmitt | G05D 1/0225 |

FOREIGN PATENT DOCUMENTS

| | | |
|---|---|---|
| JP | 2001-28095 A | 1/2001 |
| JP | 2002-169614 A | 6/2002 |
| JP | 2004-151752 A | 5/2004 |
| JP | 2004-279154 A | 10/2004 |
| JP | 2013-15735 A | 1/2013 |
| JP | 2018-165855 A | 10/2018 |
| JP | 2019-185294 A | 10/2019 |
| WO | 2019/142737 A1 | 7/2019 |

OTHER PUBLICATIONS

Dongyan Wei et al., "Vehicle Localization Based on Odometry Assisted Magnetic Matching", 2017 International Conference on Indoor Positioning and Indoor Navigation (IPIN), IEEE, Sep. 18-21, 2017, total 6 pages.

Yeun Sub Byun et al., "Localization Based on Magnetic Markers for an All-Wheel Steering Vehicle", Sensors, vol. 16, No. 12, 2016, Nov. 29, 2016, total 16 pages.

International Search Report and Written Opinion mailed on Jan. 19, 2021, received for PCT Application PCT/JP2020/043478, Filed on Nov. 20, 2020, 8 pages including English Translation.

* cited by examiner

MAP DATA AND MAP DATA GENERATION METHOD

CROSS-REFERENCE TO RELATED APPLICATIONS

The present application is based on PCT filing PCT/JP2020/043478, filed Nov. 20, 2020, which claims priority to JP 2019-211865, filed Nov. 22, 2019, the entire contents of each are incorporated herein by reference.

TECHNICAL FIELD

The present invention relates to a map usable for vehicle driving assist control and a method of generating the map.

BACKGROUND ART

In recent years, various driving assist techniques have been suggested for reducing vehicle driving loads and are being achieved. As driving assist techniques, there are driving assist techniques in which part of vehicle control is carried out by a vehicle side, for example, braking control in an automatic braking function, steering control in a lane keeping function, and so forth (for example, refer to Patent Literature 1 below). Furthermore, there are sophisticated driving assist techniques for achieving automatic driving in which almost entire vehicle control including steering control and braking control is carried out on the vehicle side to make operation loads on a driver side close to zero.

CITATION LIST

Patent Literature

Patent Literature 1: Japanese Unexamined Patent Application Publication No. 2019-185294

SUMMARY OF INVENTION

Technical Problem

To achieve sophisticated driving assist techniques, it is required that the position of an own vehicle in a map for use in vehicle control can be grasped with high accuracy. If the position of the own vehicle in the map cannot be grasped with high accuracy, the surrounding road structure cannot be grasped on the vehicle side with high accuracy, making autonomous vehicle control with vehicle movement difficult.

The present invention was made in view of the above-described conventional problem, and is to provide a map that can be used to estimate the position of an own vehicle and a method of generating the map.

Solution to Problem

One mode of the present invention resides in a map generation method of generating, using by a measuring vehicle including a magnetic sensor, a map to be used to estimate an own vehicle position by a vehicle which can measure magnetism acting from a road surface side forming a surface of a traveling road, the method comprising:

a positioning process of acquiring a position of the measuring vehicle;

a magnetic measurement process of measuring magnetic data on the road surface by using the magnetic sensor; and an association process of associating the magnetic data measured by the magnetic measurement process with a point on the map corresponding to the position of the measuring vehicle acquired in the positioning process.

One mode of the present invention resides in a map usable for control for vehicle driving assist or vehicle automatic driving, wherein a road-surface magnetic distribution, which is a distribution of magnetic data at each point on a road surface forming a surface of a traveling road, is associated with the map.

Advantageous Effects of Invention

The map according to the present invention is a map in which magnetic data is associated with each point on the road surface. For example, if the vehicle includes a magnetic sensor, it is possible to acquire a distribution of magnetic data which can be collated with a distribution of magnetic data associated with the map. By comparing the distribution of magnetic data associated with the map and the distribution of magnetic data acquired on the vehicle side, in the distribution of magnetic data associated with the map, an area corresponding to the distribution of magnetic data acquired on the vehicle side can be specified. If this corresponding area can be identified in the map, the position of the vehicle can be estimated in the map.

Thus, the map of the present invention can be used to estimate the position of the own vehicle. According to the method of the present invention, it is possible to generate this map that can be used to estimate the position of the own vehicle.

DESCRIPTION OF EMBODIMENTS

In the present invention, as magnetic data to be associated with points on a map, the magnitudes of magnetism at the respective points on the road surface are suitable, as well as magnetic gradients. A magnetic gradient can be obtained from, for example, a difference between the magnitudes of magnetism at two locations on the road surface. Also, for example, when magnetism on the road surface is measured by using a sensor array having magnetic sensors arrayed thereon, a magnetic gradient can be obtained from a difference between magnetic measurement values from adjacent magnetic sensors. Also, for example, a temporal magnetic gradient may be obtained from a difference between magnetic measurement values at different times from one magnetic sensor. Furthermore, it can be thought that, for example, a magnetic gradient obtained by obtaining this difference forming a temporal magnetic gradient for each of two magnetic sensors and further taking a difference between these two magnetic sensors.

In the magnetic gradient, a magnetic component acting uniformly or almost uniformly on the magnetic sensor is suppressed. For this reason, in the magnetic gradient, a magnetic component acting from a magnetism generation source that is present relatively far away is suppressed, and a magnetic component acting from a magnetism generation source that is present relatively near, such as one on the road surface or the like, is relatively emphasized. Therefore, by adopting the magnetic gradient as magnetic data to be associated with points on the map, influences by magnetism generation sources such as surrounding vehicles, guardrails, and billboards and influences by terrestrial magnetism can be suppressed, and the map becomes in a state in which magnetism on the road surface is reflected with high accuracy.

Embodiments of the present invention are specifically described by using the following embodiments.

First Embodiment

The present embodiment is an example regarding map 1 with which road-surface magnetic distribution M2 is associated, which is a magnetic distribution of respective points on a road surface of a road (one example of a traveling road), and a method of generating the map. Details of this are described by using FIG. 1 to FIG. 9.

Map 1 (FIG. 1) of the present embodiment is a map in which road-surface magnetic distribution M2 is associated with structure map M1 representing a road structure and so forth. Structure map M1 and road-surface magnetic distribution M2 are associated with each other via position data indicating absolute positions. Each position in road-surface magnetic distribution M2 uniquely corresponds to any position on structure map M1. Therefore, if an area of a distribution pattern identical to that of the magnetic distribution on the road surface measured by a vehicle can be specified in road-surface magnetic distribution M2, the own vehicle position (position of the vehicle) on map 1 can be estimated.

Figure 2:
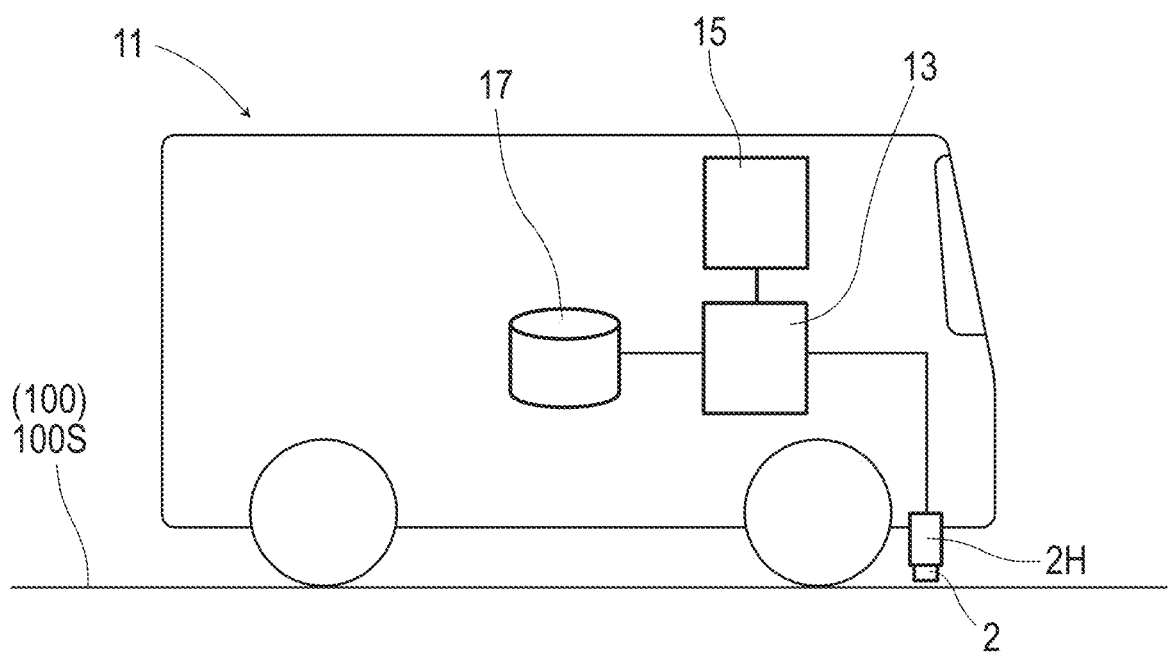
FIG. 2 is a side view of a measuring vehicle in the first embodiment.
Figure 3:
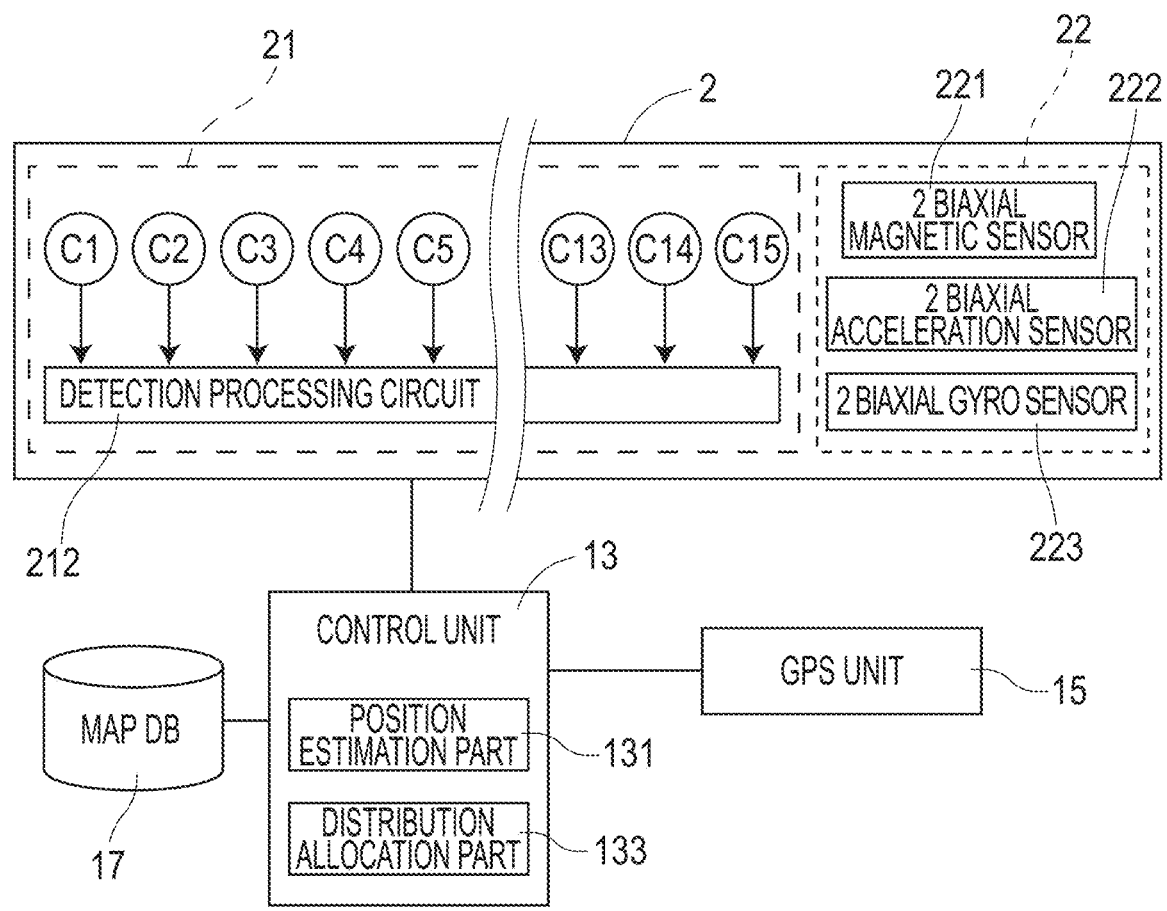
FIG. 3 is a block diagram depicting the configuration of the measuring vehicle in the first embodiment.

Map 1 can be generated by using, for example, measuring vehicle 11 exemplarily depicted in FIG. 2 and FIG. 3. Measuring vehicle 11 associates magnetic data with respective points on the map by associating magnetic data with respective points in road-surface magnetic distribution M2 based on road-surface magnetic distribution M2 in a blank state before magnetic data is associated (association process). Note that position data of absolute positions are linked to the respective points on road-surface magnetic distribution M2 even in a blank state and are associated with structure map M1.

Measuring vehicle 11 includes GPS unit 15, measuring unit 2 which detects magnetism, control unit 13, and map database (map DB) 17. GPS unit 15 is a unit which performs positioning process of positioning an absolute position by using a GPS (Global Positioning System) satellite. This GPS unit 15 supports a relative positioning method called RTK (RealTime Kinematic Global Positioning System). GPS unit 15 can perform positioning with accuracy of several centimeters by relative positioning using a reference station. Note that GPS unit 15 is configured to perform positioning by taking the position of the center (position of magnetic sensor C8 described further below) of sensor array 21 as measurement position POS. GPS unit 15 inputs position information indicating measurement position POS to control unit 13.

Measuring unit 2 is, as in FIG. 3, an elongated-rod-shaped unit having sensor array 21 including magnetic sensors Cn and IMU (Inertial Measurement Unit) 22 integrated together. Measuring unit 2 is attached along a vehicle-width direction in a state of being near road surface 100S. Measuring unit 2 is hung from the bottom surface of measuring vehicle 11 so that a gap between road surface 100S and sensor array 21 is 2 cm to 5 cm. According to sensor array 21, magnetic data at each point near the road surface can be acquired as magnetic data on the road surface. Note that measuring unit 2 is attached to measuring vehicle 11 via height adjustment mechanism 2H so as to constantly retain the gap between itself and road surface 100S.

Sensor array 21 includes fifteen magnetic sensors Cn (n is an integer of 1 to 15) arranged with 0.1-meter pitches along a longitudinal direction and detection processing circuit 212 which performs various arithmetic processes. Detection processing circuit 212 controls each magnetic sensor Cn so as to be able to acquire magnetic measurement values (magnitudes of magnetism) simultaneously measured by fifteen magnetic sensors Cn arranged with 0.1-meter pitches. According to sensor array 21 having the plurality of magnetic sensors Cn arrayed thereon, it is possible to simultaneously acquire magnetic measurement values at a plurality of locations on the road surface as magnetic data. Here, simultaneousness does not mean physically strict simultaneousness. Simultaneousness means simultaneity to the extent that it is possible to regard as simultaneousness in arithmetic process, for example, during the same loop in an arithmetic process loop repeatedly performed. Note that, in the present embodiment, the magnitude of magnetism at each point on the road surface is adopted as magnetic data to be associated with each point on the road surface.

Magnetic sensors Cn are sensors which detect magnetism by using the known MI effect (Magneto Impedance Effect) in which the impedance of a magneto-sensitive body such as an amorphous wire sensitively changes in response to the external magnetic field. Magnetic sensors Cn of the present embodiment has highly-sensitive detection performance with a measurement range of magnetic flux density of ±0.6 mT and a magnetic flux density resolution of 0.02 μT within the measurement range.

In each magnetic sensor Cn, magneto-sensitive bodies are arranged along orthogonal biaxial directions, allowing detection of magnetism acting in these orthogonal biaxial directions. In the present embodiment, magnetic sensors Cn are incorporated in sensor array 21 so that sensor array 21 attached to measuring vehicle 11 along the vehicle-width direction can detect magnetic components in a forwarding direction and the vehicle-width direction.

Note that, in the measuring vehicle 11 of the present embodiment, the position of magnetic sensor C8 at the center in fifteen magnetic sensors Cn corresponds to the above-described measurement position POS.

Detection processing circuit 212 of sensor array 21 is an arithmetic circuit which performs magnetic measurement process and others. This detection processing circuit 212 is configured by using, in addition to a CPU (central processing unit) which performs various calculations, memory elements such as a ROM (read only memory) and RAM (random access memory), and so forth.

Detection processing circuit 212 acquires a sensor signal (magnetic measurement value) outputted from each magnetic sensor Cn at a frequency of, for example, 3 kHz. With magnetic measurement by magnetic sensors Cn being performed at the frequency of, for example, 3 kHz, map 1 can be generated while measuring vehicle 11 is traveling. Detection processing circuit 212 combines magnetic components in the forwarding direction and magnetic components in the vehicle-width direction for each magnetic sensor Cn to specify the magnitude of acting magnetism. Then, detection processing circuit 212 obtains, for each magnetic sensor Cn, the magnitude of magnetism (magnetic measurement value forming one example of magnetic data) acting along a horizontal plane defined by the forwarding direction and the vehicle-width direction. Detection processing circuit 212 inputs, to control unit 13, a one-dimensional magnetic distribution formed of magnetic measurement values simultaneously measured by respective magnetic sensors Cn.

IMU 22 incorporated in measuring unit 2 is an inertial navigation unit which estimates a relative position of measuring vehicle 11 by inertial navigation. IMU 22 includes biaxial magnetic sensor 221, which is an electronic compass which measures an azimuth, biaxial acceleration sensor 222 which measures acceleration, and biaxial gyro sensor 223 which measures an angular velocity.

IMU 22 calculates a temporary displacement amount by double integration of acceleration, and also calculates, with high accuracy, a temporary azimuth of measuring vehicle 11 by using an azimuth change amount, which is an integral of angular velocity, a measured azimuth, and so forth. IMU 22 then accumulates displacement amounts along the azimuth of measuring vehicle 11 to calculate a relative position with respect to a reference position. By using the relative position estimated by IMU 22, measurement position POS can be estimated even under an environment in which positioning by GPS is unstable, such as in a tunnel or between buildings. IMU 22 inputs to control unit 13 information indicating a relative position as well as azimuth information indicating azimuth dir of measuring vehicle 11.

Control unit 13 (FIG. 3) is a unit which generates map 1 by allocating the one-dimensional magnetic distribution from sensor array 21 to road-surface magnetic distribution M2. Control unit 13 includes an electronic substrate (omitted in the drawings) having, in addition to a CPU which performs various calculations, memory elements such as a ROM and RAM and so forth implemented thereon. To control unit 13, a storage device such as a hard disk drive is connected. In a storage area of the storage device, map database (map DB) 17 is provided. Map 1 generated by measuring vehicle 11 is stored in this map DB 17.

Figure 1:
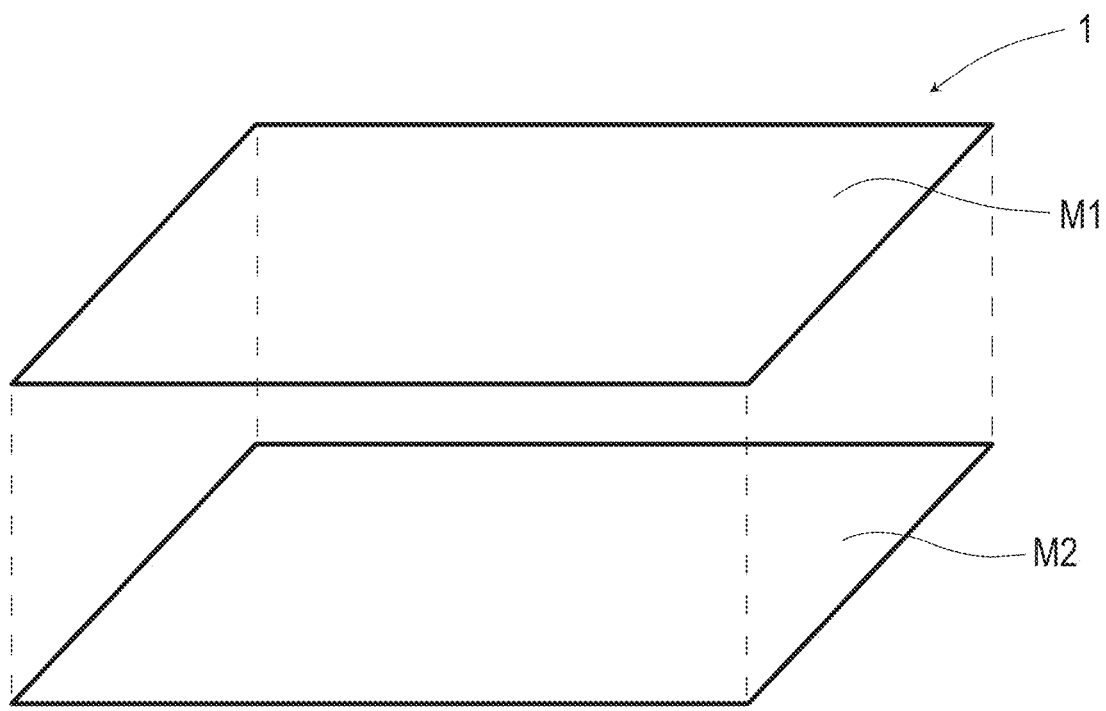
FIG. 1 is a descriptive diagram of a map in a first embodiment.

Map 1 is a map in which, as described above, road-surface magnetic distribution M2 is associated with structure map M1 (refer to FIG. 1). Structure map M1 and road-surface magnetic distribution M2 are associated with each other via position data. Road-surface magnetic distribution M2 stored in advance in map DB 17 to generate map 1 is a magnetic distribution in a blank state before magnetic data is associated with each point. However, position data indicating an absolute position is linked to each point in the road-surface magnetic distribution M2 in the blank state. With measuring vehicle 11 traveling road 100, magnetic measurement values (magnetic data) from measuring vehicle 11 can be sequentially associated with the points in road-surface magnetic distribution M2.

Control unit 13 includes functions as (1) position estimation part 131 which estimates measurement position POS and (2) distribution allocation part 133 which allocates the one-dimensional magnetic distribution from measuring unit 2 to road-surface magnetic distribution M2.

(1) Position Estimation Part

When measurement position POS from GPS unit 15, control unit 13 as position estimation part 131 estimates the measurement position POS as the position of the center of sensor array 21 (position of magnetic sensor C8). On the other hand, when being unable to acquire accuracy-ensured position information from GPS unit 15, measurement position POS is estimated by using relative position information acquired from measuring unit 2 (IMU 22). Specifically, control unit 13 takes immediately-previous measured position by GPS unit 15 (previous measurement position POS) as a reference position and estimates a position obtained by shifting the reference position by the relative position as measurement position POS.

(2) Distribution Allocation Part

Control unit 13 as distribution allocation part 133 sequentially allocates one-dimensional magnetic distributions acquired from sensor array 21 to road-surface magnetic distribution M2 in a blank state stored in map DB 17. Distribution allocation part 133 allocates one-dimensional magnetic distributions to road-surface magnetic distribution M2 by an association process of associating magnetic measurement values (quantities of magnetism, which are one example of magnetic data) at a plurality of locations each configuring a one-dimensional magnetic distribution to a plurality of points on the map.

Figure 4:
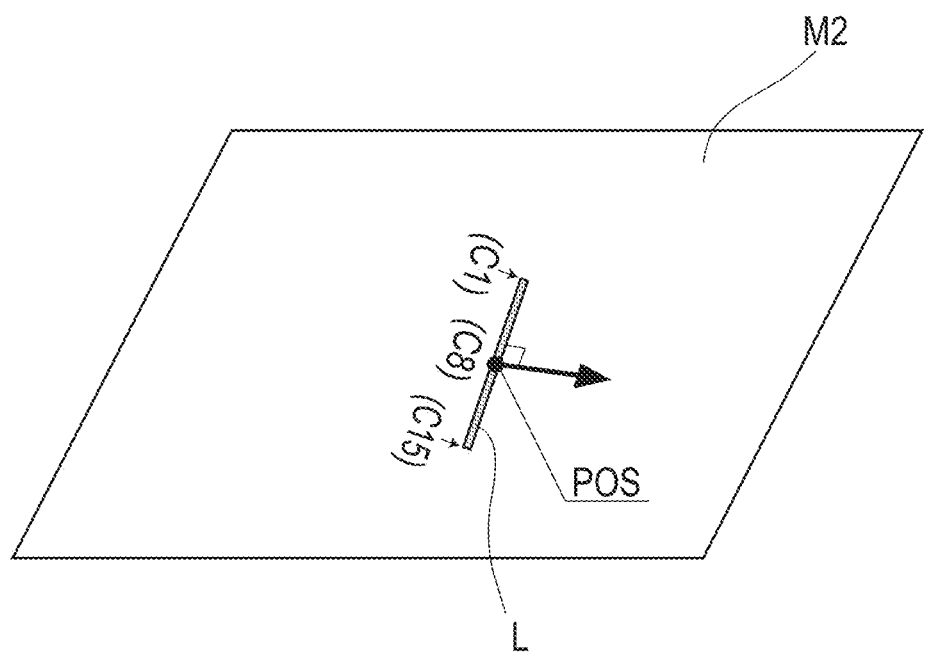
FIG. 4 is a descriptive diagram depicting a one-dimensional magnetic distribution in a road-surface magnetic distribution in the first embodiment.

Control unit 13 first specifies, as in FIG. 4, a point corresponding to measurement position POS estimated by position estimation part 131 in road-surface magnetic distribution M2. The point specified in this manner in road-surface magnetic distribution M2 is the center of the one-dimensional magnetic distribution acquired from measuring unit 2, that is, a point with which the magnetic measurement value of magnetic sensor C8 is to be associated.

Furthermore, control unit 13 specifies the posture of one-dimensional magnetic distribution L in road-surface magnetic distribution M2 based on azimuth dir of measuring vehicle 11 indicated by azimuth information acquired from IMU 22 (FIG. 4). Control unit 13 rotates one-dimensional magnetic distribution L by taking measurement position POS as a center so that the distribution is orthogonal to azimuth dir of measuring vehicle 11, thereby specifying the posture of one-dimensional magnetic distribution L. Control unit 13 then associates magnetic measurement values (measured values of quantities of magnetism) configuring one-dimensional magnetic distribution L to the respective points in a one-dimensional area in road-surface magnetic distribution M2 occupied by one-dimensional magnetic distribution L.

Figure 5:
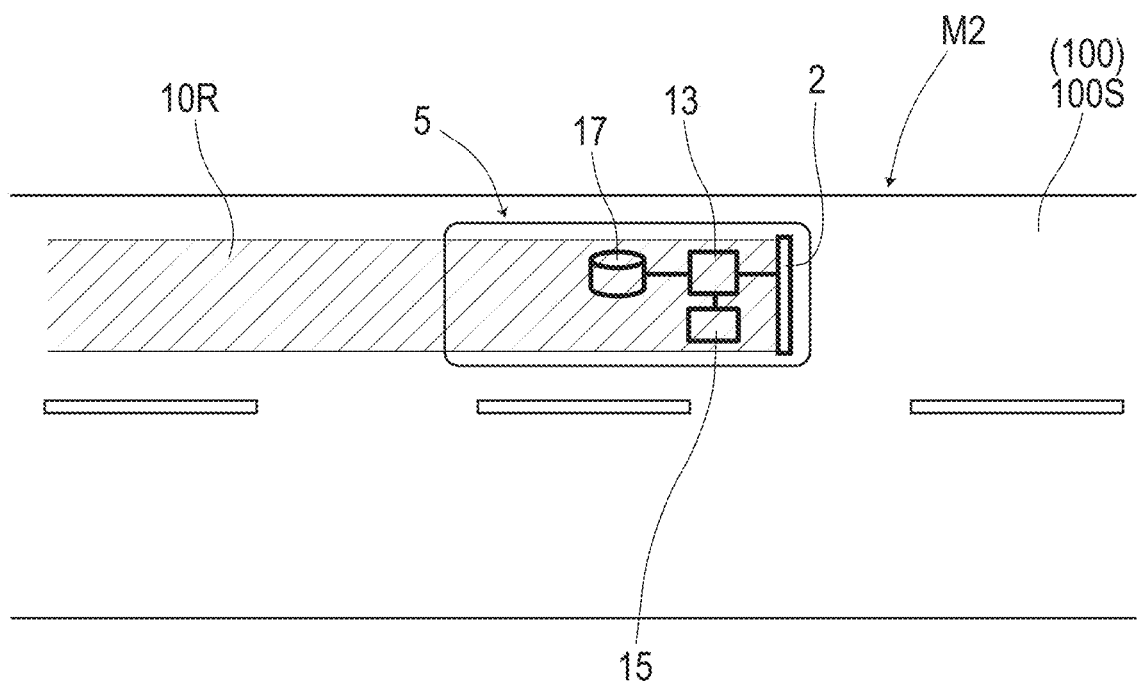
FIG. 5 is a descriptive diagram depicting a state in which the measuring vehicle generates the road-surface magnetic distribution in the first embodiment.
Figure 6:
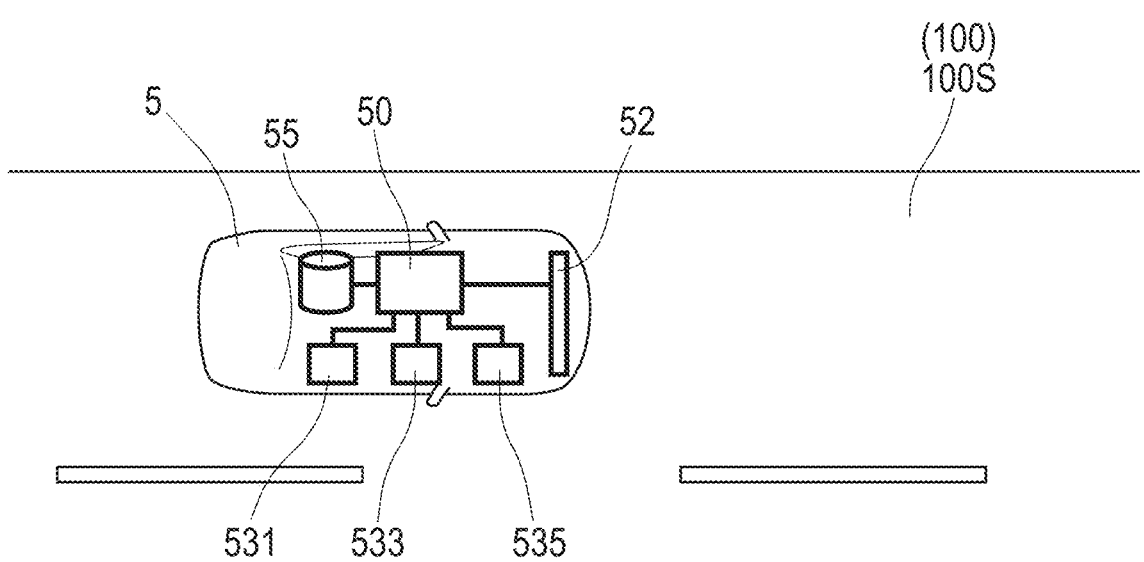
FIG. 6 is a descriptive diagram of a vehicle using the map in the first embodiment.
Figure 7:
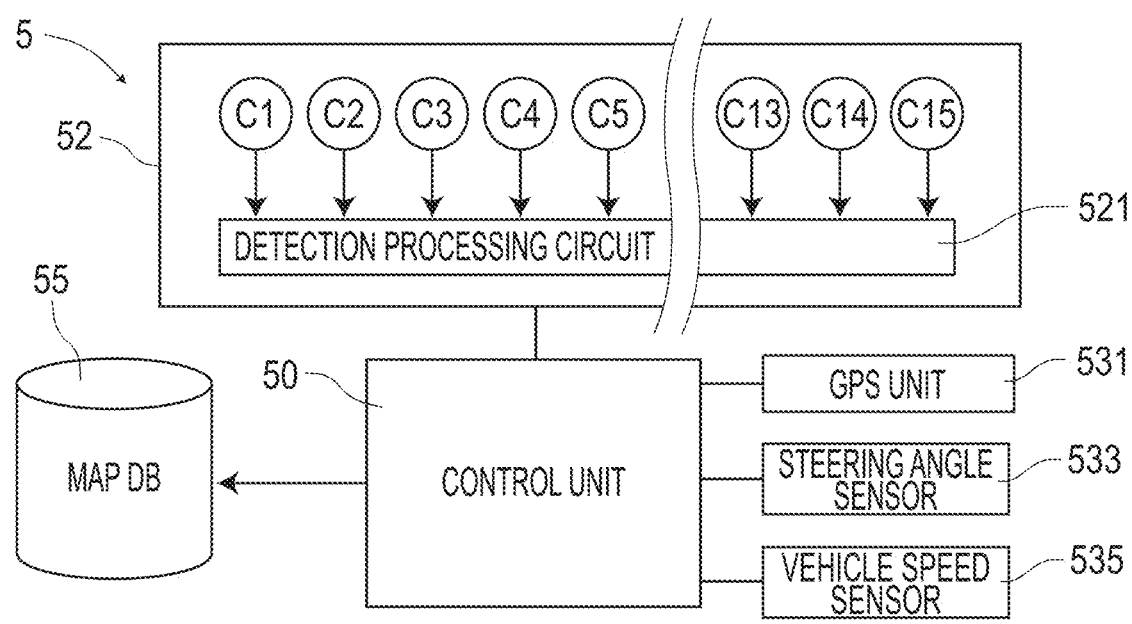
FIG. 7 is a block diagram depicting the configuration of the vehicle using the map in the first embodiment.

When measuring vehicle 11 configured as described above is caused to travel along road 100, as in FIG. 5, a magnetic distribution of band-shaped area 10R along a path traveled by measuring vehicle 11 can be allocated to road-surface magnetic distribution M2. If measuring vehicle 11 is repeatedly caused to travel as the position in the vehicle-width direction is changed, a magnetic distribution can be generated over an almost entire area of road surface 100S.

According to sensor array 21, magnetic measurement values at the plurality of, that is, fifteen, locations aligned on one straight line can be simultaneously acquired, and one-dimensional magnetic distribution L can be acquired. If measuring vehicle 11 having this sensor array 21 attached along the vehicle-width direction is caused to travel, the magnetic distribution of two-dimensional band-shaped area 10R scanned by sensor array 21 can be efficiently acquired, and road-surface magnetic distribution M2 can be efficiently generated.

Here, as a reference example, an example of a method is described in which vehicle 5 estimates its own vehicle position by using map 1 (FIG. 1) in which road-surface magnetic distribution M2 is associated with structure map M1. Vehicle 5 includes, as in FIG. 6 and FIG. 7, sensor array 52 including magnetic sensors Cn, map database (map DB) 55 having map 1 (refer to FIG. 1) stored therein, control unit 50 which performs various calculations, and so forth. Furthermore, connected to control unit 50 are GPS unit 531 which performs positioning calculation using a GPS satellite and so forth, steering angle sensor 533 which detects a steering direction, vehicle speed sensor 535, and so forth.

As with sensor array 21 of measuring vehicle 11, sensor array 52 is an elongated-rod-shaped unit including fifteen magnetic sensors Cn (n is an integer of 1 to 15) and detection processing circuit 521 having a CPU not depicted and so forth incorporated therein. Sensor array 52 has a configuration approximately similar to that of sensor array 21 with which measuring vehicle 11 is equipped. Sensor array 52 acquires a one-dimensional magnetic distribution formed of magnetic measurement values for every 0.1 meters and inputs it to control unit 50.

Control unit 50 is a unit which performs calculation for estimating an own vehicle position on map 1 (refer to FIG. 1) and so forth. Control unit 50 includes an electronic substrate (omitted in the drawings) having, in addition to a CPU which performs various calculations, memory elements such as a ROM and RAM and so forth implemented thereon. Control unit 50 estimates an own vehicle position by using the one-dimensional magnetic distribution acquired from sensor array 52.

Figure 8:
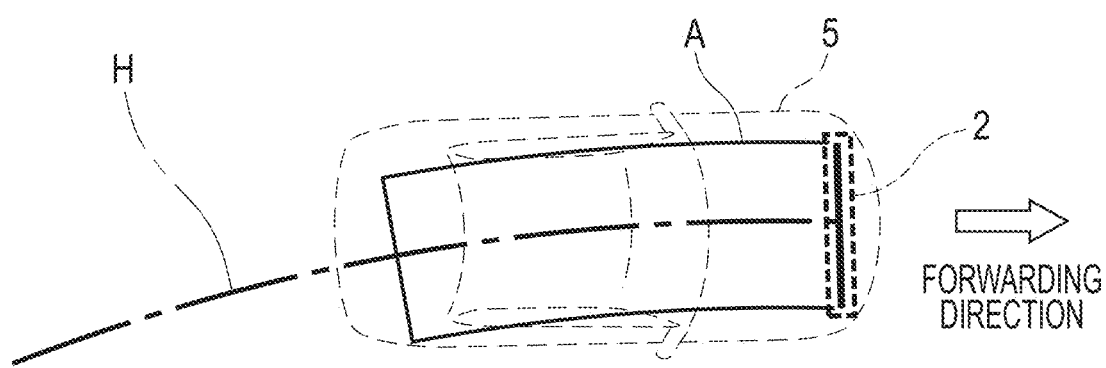
FIG. 8 is a descriptive diagram of a two-dimensional magnetic distribution generated by the vehicle in the first embodiment.

Control unit 50 accumulates one-dimensional magnetic distributions acquired by sensor array 52, along traveling path H, to generate two-dimensional magnetic distribution A (FIG. 8). Control unit 50 collates two-dimensional magnetic distribution A with road-surface magnetic distribution M2 to specify a corresponding area, with a high degree of matching, of two-dimensional magnetic distribution A in road-surface magnetic distribution M2. Control unit 50 estimates an own vehicle position based on the position of this corresponding area in the map.

Figure 9:
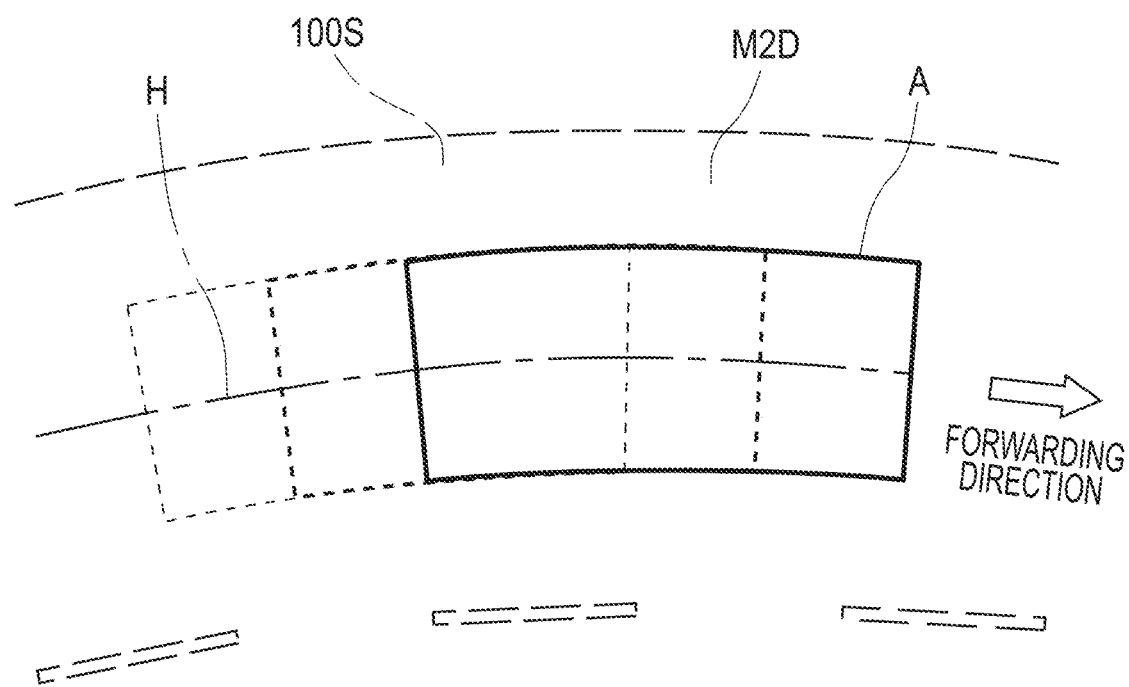
FIG. 9 is a descriptive diagram of a state in which the road-surface magnetic distribution and the two-dimensional magnetic distribution are collated in the first embodiment.

Specifically, as shifting the position of two-dimensional magnetic distribution A in road-surface magnetic distribution M2, control unit 50 obtains a cross-correlation coefficient indicating a degree of matching between both (FIG. 9). Then, in road-surface magnetic distribution M2, an occupying area of two-dimensional magnetic distribution A with the highest cross-correlation coefficient is specified. Two-dimensional magnetic distribution A generated by vehicle 5 is an area which has, as an end portion, one-dimensional magnetic distribution L corresponding to a one-dimensional area on the road surface which sensor array 52 included in vehicle 5 faces and extends along traveling path H. If the area in road-surface magnetic distribution M2 corresponding to two-dimensional magnetic distribution A can be specified, the own vehicle position on the map can be estimated.

Note that there is a possibility that efficiency of randomly searching for an area in road-surface magnetic distribution M2 corresponding to two-dimensional magnetic distribution A generated by vehicle 5 is not favorable. By using the measured position by GPS unit 531, a nearby range with reference to the measured position may be set as a search range. In this case, by searching for the area corresponding to two-dimensional magnetic distribution A limiting to the search range which is part of road-surface magnetic distribution M2, the own vehicle position can be efficiently estimated.

By using map 1 (FIG. 1) of the present embodiment, the own vehicle position can be estimated even on a road in a tunnel, between buildings, or the like, where a reception state of satellite radio waves of GPS is unstable. Also, in estimation of the own vehicle position using map 1, unlike position estimation by inertial navigation, positional errors are not accumulated.

By comparing road-surface magnetic distribution M2 and two-dimensional magnetic distribution A generated by vehicle 5, the position and posture of two-dimensional magnetic distribution A in road-surface magnetic distribution M2 can be specified. For example, after the own vehicle position is estimated, by specifying the position and posture of two-dimensional magnetic distribution A in road-surface magnetic distribution M2, it is possible to grasp a change of a relative position and azimuth (orientation of the vehicle) with reference to the estimated own vehicle position. Therefore, the configuration of estimating the position of vehicle by comparing road-surface magnetic distribution M2 and two-dimensional magnetic distribution A can be an alternative an IMU.

In road-surface magnetic distribution M2 configuring map 1, the magnitude of the quantity of magnetism is formed depending on magnetism generation sources, such as a magnetic material mixed into the pavement material forming road surface 100S, a metal-made manhole installed on road surface 100S, and a joint of a bridge. Since these magnetism generation sources are positionally fixed onto road surface 100S, positional fluctuations are small. By using road-surface magnetic distribution M2 derived from the positionally-fixed magnetism generation sources, the own vehicle position on the map can be estimated with high accuracy.

Note that the road surface may be paved by using a pavement material having a magnetic material such as magnetic powder of iron oxide mixed therewith. In this case, the magnetic material in the pavement material is magnetized, and undulations of road-surface magnetic distribution M2 tend to increase. When the undulations of the magnetic distribution expand, collation between magnetic distributions becomes easy and accuracy can be improved. Note that it is also preferable to magnetize unevenly the road surface paved with the pavement material having the magnetic material mixed therewith. In this case, the undulations of the magnetic distribution can be further expanded, and collation between magnetic distributions becomes easy. A pavement material having a magnetic material mixed therewith and a normal pavement material not including a magnetic material may be prepared. In this case, the pavement materials of two types may be supplied unevenly to the road surface without being mixed together. Since a difference in composition ratio of the pavement materials occurs in accordance with the position on the road surface, this can expand the undulations of the magnetic distribution.

After paved by using the pavement material having the magnetic material mixed therewith, the road surface may be magnetized. For example, the road surface may be magnetized so that a predetermined pattern is formed, such as a checkered pattern in which a rectangular area with strong magnetism and a rectangular area with weak magnetism alternately appear. By using the pattern formed with strong and weak magnetisms, collation between magnetic distributions becomes easy, and position estimation accuracy can be improved. Also, when the road surface is magnetized so as to form a predetermined pattern, for example, by using a dividing line between a rectangular area with a large quantity of magnetism and a rectangular area with a small quantity of magnetism, collation with a measured magnetic distribution can be efficiently performed. For example, when the measured magnetic distribution includes a dividing line, it is only required that collation be performed by presuming coincidence with a dividing line in road-surface magnetic distribution M2. The predetermined pattern may be an information-readable pattern such as a one-dimensional or two-dimensional barcode.

Furthermore, road surface 100S may be magnetized so that a magnetic singular point appears on road surface 100S paved with the pavement material having the magnetic material mixed therewith. In this manner, by creating magnetic singular points with magnetic powder of iron oxide or the like, collation between magnetic distributions becomes easy. By presuming coincidence of singular points, combinations where the singular points do not coincide can be eliminated at the time of collation between magnetic distributions, allowing collation to be efficiently performed.

Note that a procedure is described in the present embodiment in which map 1 is generated by using measuring vehicle 11 with a gap between road surface 100S and measuring unit 2 being set at 2 cm to 5 cm. Measuring unit 2 may be attached in a range of 100 mm to 250 mm assumed as an attachment height of magnetic sensors in a general vehicle. In this case, measuring unit 2 measures not magnetic data at each point near the road surface but magnetic data on the road surface acting on each point away from the road surface 100S in a height direction. Thus, road-surface magnetic distribution M2 may be a distribution of magnetic data at each point away from road surface 100S in the height direction.

In a vehicle using the map, collation between a road-surface magnetic distribution at each point away from road surface 100S in the height direction and a measured magnetic distribution may be performed. Alternatively, from magnetic data at each point away from road surface 100S in the height direction, a magnetic distribution at each point on the surface of the road surface may be estimated, and collation with the measured magnetic distribution may be performed.

In measuring vehicle 11, two magnetic sensors at different attachment heights may be arranged along a vertical direction. In this case, a magnetic attenuation ratio in the height direction can be grasped. By using the magnetic attenuation ratio in the height direction, it is possible to improve accuracy in estimating a magnetic distribution at each point on the road surface from magnetic data at each point away from road surface 100S in the height direction.

In the present embodiment, measuring vehicle 11 having sensor array 21 attached at a height of 2 cm to 5 cm from the road surface is exemplarily described. Sensor array 21 may be taken as a first sensor array and a second sensor array attached away from the road surface in the height direction may be adopted. As road-surface magnetic distribution M2, first road-surface magnetic distribution M2 that is a distribution of magnetic data near the road surface and second road-surface magnetic distribution M2 that is a distribution of magnetic data at a height of XX cm above the road surface may be generated. A map in this case is configured of, in addition to structure map M1, first and second road-surface magnetic distributions M2. With road-surface magnetic distributions of two types or more with different heights, the magnetic attenuation ratio and so forth can be grasped, and accuracy of estimation of the magnetic distribution at a specific height can be improved.

As a sensor array or magnetic sensor away from the road surface in the height direction, a plurality of sensor arrays with different heights or the like may be provided to configure map 1 including road-surface magnetic distributions M2 of a plurality of kinds with different measurement heights. In this case, when collation with a magnetic distribution measured by any vehicle is performed, road-surface magnetic distribution M2 measured at a height close to the attachment height of the sensor array or magnetic sensor in that vehicle is preferably selected to perform the collation. Also, an arithmetic equation representing the degree of attenuation of magnetic strength (such as the magnitude of magnetism or magnetic gradient) in the height direction may be associated with each position on map 1. In this case, based on road-surface magnetic distribution M2, a distribution of magnetic data at a specific height can be easily estimated. The arithmetic equation to be associated with each position on map 1 (arithmetic equation representing a degree of attenuation of magnetic strength) may be a theoretical arithmetic equation, or an approximate expression representing changes from the magnetic data in first road-surface magnetic distribution M2 to the magnetic data in second road-surface magnetic distribution M2 described above.

In the present embodiment, as magnetic data at each point in road-surface magnetic distribution M2, the quantity of magnetism acting along a horizontal plane defined by the forwarding direction and the vehicle-width direction is exemplarily described. In place of this, a magnetic sensor which detects a magnetic component in the vertical direction may be adopted, and the quantity of magnetism in the vertical direction may be taken as magnetic data at each point in road-surface magnetic distribution M2. Furthermore, a vector represented by a component in the forwarding direction and a component in the vehicle-width direction measured by the magnetic sensor may be taken as magnetic data at each point in road-surface magnetic distribution M2.

A magnetic sensor which can measure magnetic components in triaxial directions orthogonal to one another may be adopted, and a vector represented by magnetic components in the triaxial directions may be taken as magnetic data at each point in road-surface magnetic distribution M2.

In the present embodiment, map 1 is generated by measuring vehicle 11 having sensor array 21 attached thereto along the vehicle-width direction, sensor array 21 having magnetic sensors arrayed on a straight line. Sensor array 21 having magnetic sensors arrayed on a straight line is not an indispensable configuration, and a measuring vehicle including one magnetic sensor may be used. When this measuring vehicle travels, a one-dimensional magnetic distribution along a traveling path can be acquired. Map 1 can be generated by making these one-dimensional magnetic distributions from the magnetic sensor sequentially associated with (allocated to) road-surface magnetic distribution M2.

In the present embodiment, for the purpose of easy understanding of the configuration of map 1, a configuration is depicted in FIG. 1 in which road-surface magnetic distribution M2 is provided separately from structure map M1 and they are mutually associated with each other. It is not imperative to provide road-surface magnetic distribution M2 independently from structure map M1 where a road structure and so forth are described. Magnetic data may also be linked to each point on map 1. The magnetic data linked to each point on map 1 indicates a magnetic distribution on the road surface.

Note that the magnetic data to be linked to each point on map 1 may be a magnetic gradient. The magnetic gradient can be obtained, for example, as a difference between quantities of magnetism at adjacent points. Also, for example, when magnetism on the road surface is measured by using a sensor array having magnetic sensors arrayed thereon or the like, for example, a magnetic gradient can be obtained from a difference between magnetic measurement values from adjacent magnetic sensors.

In the magnetic gradient, a magnetic component acting uniformly or almost uniformly on the magnetic sensor is suppressed. For this reason, in the magnetic gradient, a magnetic component acting from a magnetism generation source that is present relatively far away is suppressed, and a magnetic component acting from a magnetism generation source that is present relatively near, such as one on the road surface or the like, is relatively emphasized. The map is represented by dividing the surface of the earth. Therefore, as magnetic data to be linked to each point of the map, a magnetic gradient reflecting a magnetic component acting from a magnetism generation source on a road surface or the like that is present near the surface of the earth is suitable. With the map in which a magnetic gradient is associated with each point, influences by magnetism generation sources such as surrounding vehicles, guardrails, and billboards and influences by terrestrial magnetism can be suppressed, and accuracy of position estimation using the map can be improved.

Note that, for example, a difference between magnetic measurement values with different acquisition times may be converted into a difference per distance specified based on vehicle speed information separately provided. A difference per distance may be calculated in advance for two magnetic sensors, and a difference may be further taken between the two magnetic sensors to calculate a magnetic gradient. In this case, an effect can be expected in which the above-described magnetic gradient can be obtained without providing in advance a spacing between magnetic markers arranged on the road. Furthermore, for example, to obtain a magnetic gradient from a difference between magnetic measurement values at different times from one magnetic sensor, a magnetic gradient may be calculated from a difference per distance specified by vehicle-speed information separately provided. In this case, the necessity to set two vehicle-onboard sensor units at the front and rear is lessened. If a magnetic gradient can be obtained by one sensor unit, effects can be expected in which the design load of allocating positions for mounting sensor units can be reduced, and the cost of mounting sensor units can be reduced.

It has been described above that, by comparing the two-dimensional magnetic distribution acquired by vehicle 5 with the road-surface magnetic distribution in which magnetic data is linked to each point on the road surface, the position and posture of the two-dimensional magnetic distribution can be specified in the road-surface magnetic distribution. In the case of the road-surface magnetic distribution in which a magnetic gradient is linked to each point, the two-dimensional magnetic distribution to be collated is preferably also a distribution of magnetic gradients. In this case, the mode of changes of the magnetic data, which are magnetic gradients, becomes similar, thereby facilitating collation.

Second Embodiment

The present embodiment is an example, based on the first embodiment, of a map corresponding to road 100 (FIG. 10) where magnetic markers 10 are laid, for example, every 10 meters, and a method of generating the map. Details of this are described with reference to FIG. 10 to FIG. 14.

Measuring vehicle 11 of the present embodiment is different from the configuration of the first embodiment in that sensor array 21 (detection processing circuit 212) performs a marker detection process of detecting magnetic markers 10. Also, the map of the present embodiment is different from the map of the first embodiment in that marker arrangement points 10P, which are positions of magnetic markers 10, are plotted. Marker arrangement points 10P are one example of information indicating laying positions of magnetic markers 10. Sensor array 21 performs the marker detection process at a frequency of 3 kHz by using magnetic sensors Cn.

As described in the first embodiment, magnetic sensors Cn are configured to measure magnetic components in the forwarding direction and the vehicle-width direction of measuring vehicle 11. For example, when these magnetic sensors Cn move in the forwarding direction to pass directly above magnetic marker 10, the magnetic measurement value in the forwarding direction has its sign reversed before and after passing magnetic marker 10 as in FIG. 11, and changes so as to cross zero at a position directly above magnetic marker 10. Therefore, during traveling of vehicle, when zero-cross Zc occurs in which the sign of magnetism in the forwarding direction detected by any magnetic sensor Cn is reversed, it can be determined that sensor array 21 is positioned directly above magnetic marker 10. In this manner, when sensor array 21 is positioned directly above magnetic marker 10 and zero-cross Zc of the magnetic measurement value in the forwarding direction occurs, detection processing circuit 212 determines that magnetic marker 10 is detected.

Figure 12:
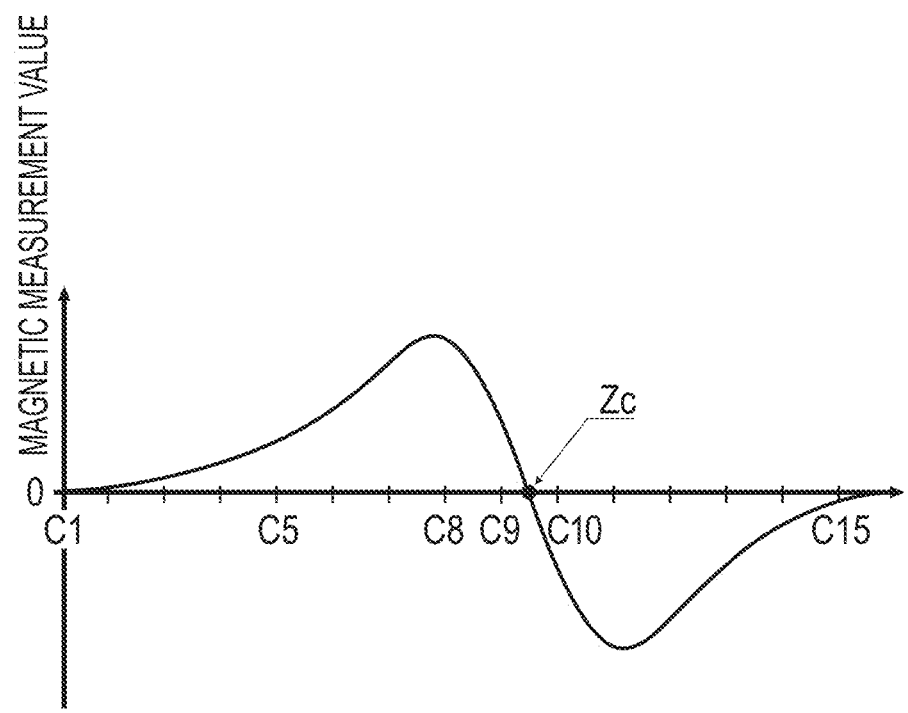
FIG. 12 is a descriptive diagram exemplarily depicting a distribution curve of magnetic measurement values in a vehicle-width direction from magnetic sensors Cn arrayed in the vehicle-width direction in the second embodiment.
Figure 13:
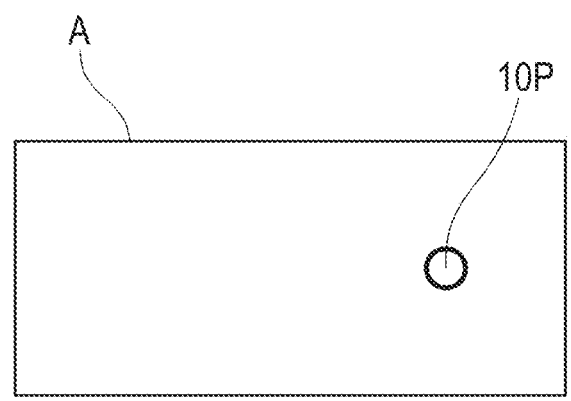
FIG. 13 is a descriptive diagram of a two-dimensional magnetic distribution generated by the vehicle in the second embodiment.
Figure 14:
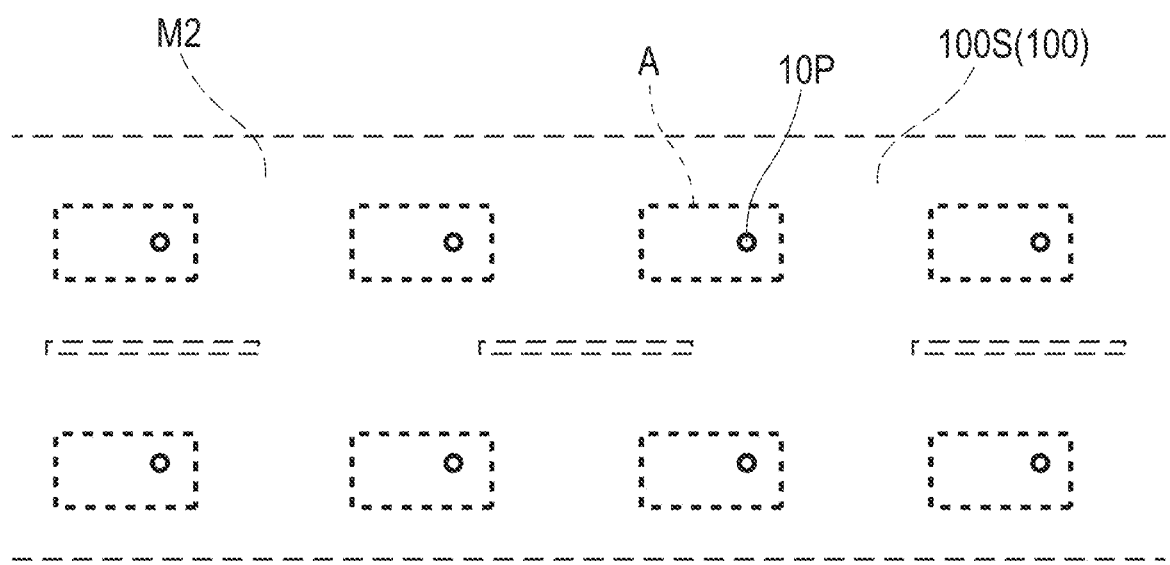
FIG. 14 is a descriptive diagram of a state in which a road-surface magnetic distribution and the two-dimensional magnetic distribution are collated in the second embodiment.

Also, for example, as for a magnetic sensor with the same specification as that of magnetic sensors Cn, a movement along a virtual line in the vehicle-width direction passing directly above magnetic marker 10 is assumed. The magnetic measurement value in the vehicle-width direction has its sign reversed on both sides across magnetic marker 10 and changes so as to cross zero at a position directly above magnetic marker 10. In the case of sensor array 21 having fifteen magnetic sensors Cn arrayed in the vehicle-width direction, the sign of the magnetic measurement value in the vehicle-width direction to be detected by magnetic sensor Cn varies depending on which side the unit is present with respect to magnetic marker 10 (FIG. 12).

Based on a distribution curve of FIG. 12 exemplarily depicting magnetic measurement values in the vehicle-width direction of each magnetic sensor Cn of sensor array 21, an intermediate position between adjacent two magnetic sensors Cn across zero-cross Zc where the magnetism in the vehicle-width direction is reversed between positive and negative, or a position straight below any of magnetic sensor Cn of which the detected magnetic measurement value in the vehicle-width direction is zero and the magnetic measurement values in the vehicle-width direction of magnetic sensors Cn on both outer sides is reversed between positive and negative is the position of the magnetic marker 10 in the vehicle-width direction. Detection processing circuit 212 can measure a deviation at the position of magnetic marker 10 in the vehicle-width direction with respect to the center position of sensor array 21 (position of magnetic sensor C8) as a lateral shift amount of measuring vehicle 11 with respect to magnetic marker 10. For example, in the case of FIG. 12, the position of zero-cross Zc is a position corresponding to C9.5 near the midpoint between C9 and C10. As described above, since the space between magnetic sensors C9 and C10 is 10 cm, the lateral shift amount of measuring vehicle 11 with respect to magnetic marker 10 is (9.5−8)×10=15 cm with reference to C8 positioned at the center of sensor array 21 in the vehicle-width direction.

When magnetic marker 10 is detected by sensor array 21, control unit 13 specifies the position of magnetic marker 10 based on measurement position POS at that time. Specifically, a position obtained by shifting from measurement position POS by the lateral shift amount measured at the time of detection of magnetic marker 10 is specified as the position of magnetic marker 10. Control unit 13 then plots marker arrangement point 10P representing the laying position of magnetic marker 10 on road-surface magnetic distribution M2. Thus, map 1 of the present embodiment is a map in which marker arrangement point 10P is plotted on road-surface magnetic distribution M2 and the position of magnetic marker 10 is linked.

Figure 10:
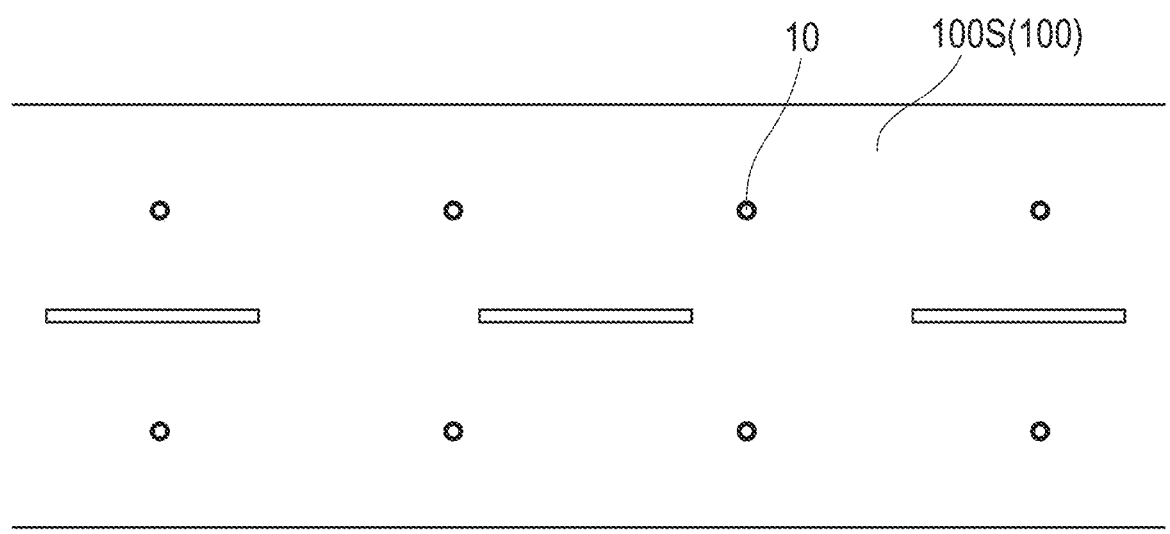
FIG. 10 is a top view of a road where magnetic markers are laid on a second embodiment.
Figure 11:
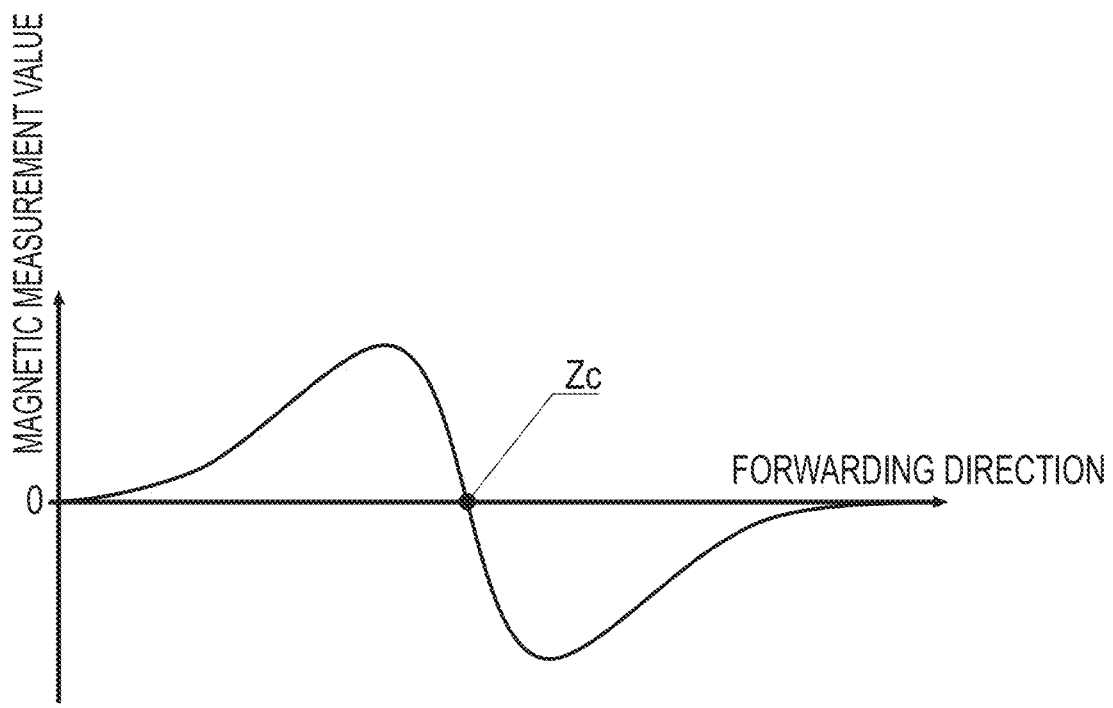
FIG. 11 is a descriptive diagram exemplarily depicting changes of a magnetic measurement value in a forwarding direction at the time of passing over a magnetic marker in the second embodiment.

Here, as a reference example, a vehicle using map 1 of the present embodiment is depicted. As with the sensor array of the measuring vehicle, this sensor array of the vehicle can perform a marker detection process. The sensor array of the vehicle performs a marker detection process similar to the marker detection process by the measuring vehicle, and detects any magnetic marker 10 laid on road 100 (FIG. 10).

Two-dimensional magnetic distribution A (FIG. 13) generated by the vehicle is similar to that of the first embodiment in that one-dimensional magnetic distributions outputted by the sensor array are two-dimensionally accumulated. Two-dimensional magnetic distribution A of the present embodiment is different from that of the first embodiment in that marker arrangement point 10P representing the position of magnetic marker 10 is plotted. Marker arrangement points 10P can be utilized as magnetic singular points in the magnetic distribution. By using this marker arrangement points 10P, as in FIG. 14, collation with two-dimensional magnetic distribution A can be performed at each position for every 10 meters where marker arrangement points 10P coincide.

In this manner, in the case of a combination of road-surface magnetic distribution M2 having a plot of marker arrangement point 10P and two-dimensional magnetic distribution A, it is only required that two-dimensional magnetic distribution A is collated at 10-meter pitches, and the amount of computation for comparing two-dimensional magnetic distribution A with road-surface magnetic distribution M2 can be significantly suppressed.

Note that the other configurations and the operation and effects are similar to those in the first embodiment.

Third Embodiment

Figure 15:
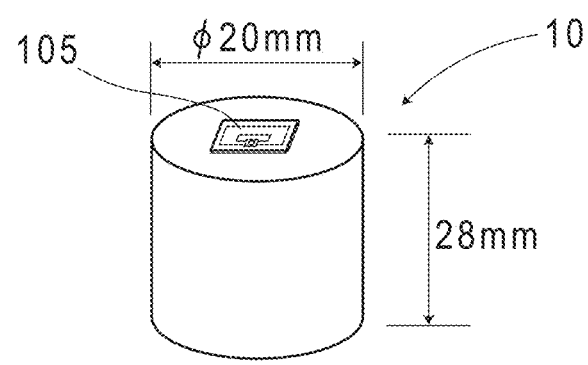
FIG. 15 is a perspective view of a magnetic marker in a third embodiment.
Figure 16:
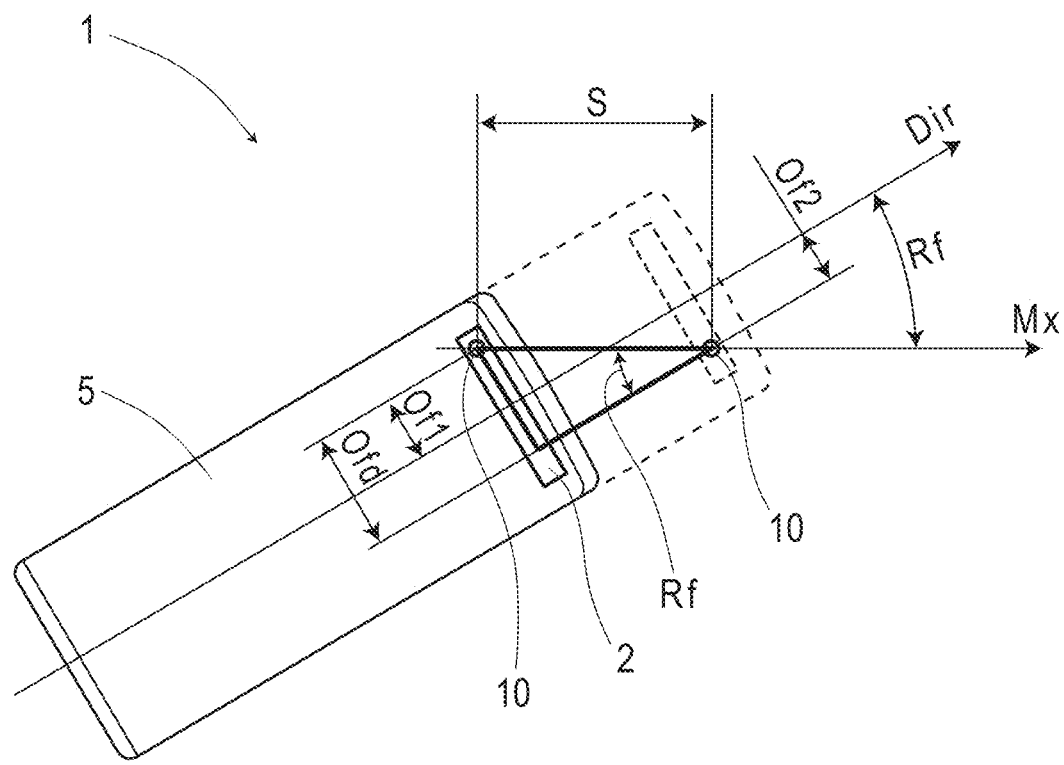
FIG. 16 is a descriptive diagram of a state of estimating the azimuth of a measuring vehicle in the third embodiment.

The present embodiment is an example based on the configuration of the measuring vehicle of the second embodiment, to which a method of positioning measurement position POS is added. Details of this are described with reference to FIG. 15 and FIG. 16.

On a road assumed in the present embodiment, magnetic markers 10 are arranged for every 2 meters (marker span S=2 meters) along the center of a lane. Magnetic marker 10 (FIG. 15) forms a columnar shape having a diameter of 20 mm and a height of 28 mm. Magnetic marker 10 is buried in a state of being accommodated in a hole provided on road surface 100S.

To magnetic marker 10, RF-ID tag 105 which wirelessly transmits position information and azimuth information is affixed. RF-ID tag 105 is laminated on an upper end face of columnar-shaped magnetic marker 10, for example, as in FIG. 15. Although omitted in the drawing, a tag reader which performs wireless communication with RF-ID tag 105 is mounted on measuring vehicle 11.

The position information to be transmitted from RF-ID tag 105 is information indicating an absolute position of corresponding magnetic marker 10. The azimuth information to be transmitted likewise is information indicating an absolute azimuth of direction Mx (one example of a predetermined direction) of a virtual line connecting corresponding magnetic marker 10 and magnetic marker 10 adjacent to this corresponding magnetic marker 10 on a downstream side in a road direction.

A control unit of measuring vehicle 11 includes, in addition to a position estimation part which estimates measurement position POS and a distribution allocation part (sign 13 in FIG. 3), an azimuth estimation part which estimates azimuth dir representing the orientation of the own vehicle. In addition to the configuration of the first embodiment, the position estimation part can estimate measurement position POS by using magnetic marker 10. The position estimation part estimates measurement position POS with reference to the absolute position (laying position of magnetic marker 10) indicated by the position information acquired from RF-ID tag 105 (positioning process).

When magnetic marker 10 is detected, the position estimation part estimates a position obtained by shifting the absolute position of magnetic marker 10 by a lateral shift amount measured by detection processing circuit 212 as measurement position POS. Also, in a period after magnetic marker 10 is detected until next magnetic marker 10 is detected, the position estimation part acquires a relative position estimated by IMU 22 in that period, and estimates measurement position POS with reference to measurement position POS estimated when immediately-previous magnetic marker 10 is detected.

The azimuth estimation part performs an azimuth estimation process for estimating the azimuth of measuring vehicle 11 with reference to direction Mx of a virtual line connecting adjacent two magnetic markers 10. The azimuth estimation part uses a difference between lateral shift amounts with respect to adjacent two magnetic markers 10 and specifies azimuth shift angle Rf, which is a deviation of measuring vehicle 11 in the forwarding direction with respect to direction Mx. Azimuth dir of measuring vehicle 11 can be estimated as an absolute azimuth, which is obtained by angularly shifting by azimuth shift angle Rf with reference to direction Mx which is an absolute azimuth.

When measuring vehicle 11 passes over adjacent two magnetic markers 10, the azimuth estimation part calculates difference Ofd between lateral shift amount Of1 with respect to first magnetic marker 10 and lateral shift amount Of2 with respect to second magnetic marker 10. The azimuth estimation part uses this difference Ofd and marker span S to calculate azimuth shift angle Rf as in the following equation. As described above, if this azimuth shift angle Rf is obtained, azimuth dir of measuring vehicle 11 can be estimated with reference to direction Mx.

$$Rf = \arcsin(Ofd/S) \quad \text{[Equation 1]}$$

Magnetic marker 10 buried in road surface 100S has less possibility of occurrence of positional fluctuations and has high positional accuracy. By using magnetic marker 10 with high positional accuracy, measurement position POS and azimuth dir can be estimated with high accuracy. If measurement position POS and azimuth dir with high accuracy can be estimated, one-dimensional magnetic distribution L acquired by measuring vehicle 11 can be allocated to road-surface magnetic distribution M2 with high positional accuracy.

Note that the other configurations and the operation and effects are similar to those in the second embodiment.

Fourth Embodiment

Figure 17:
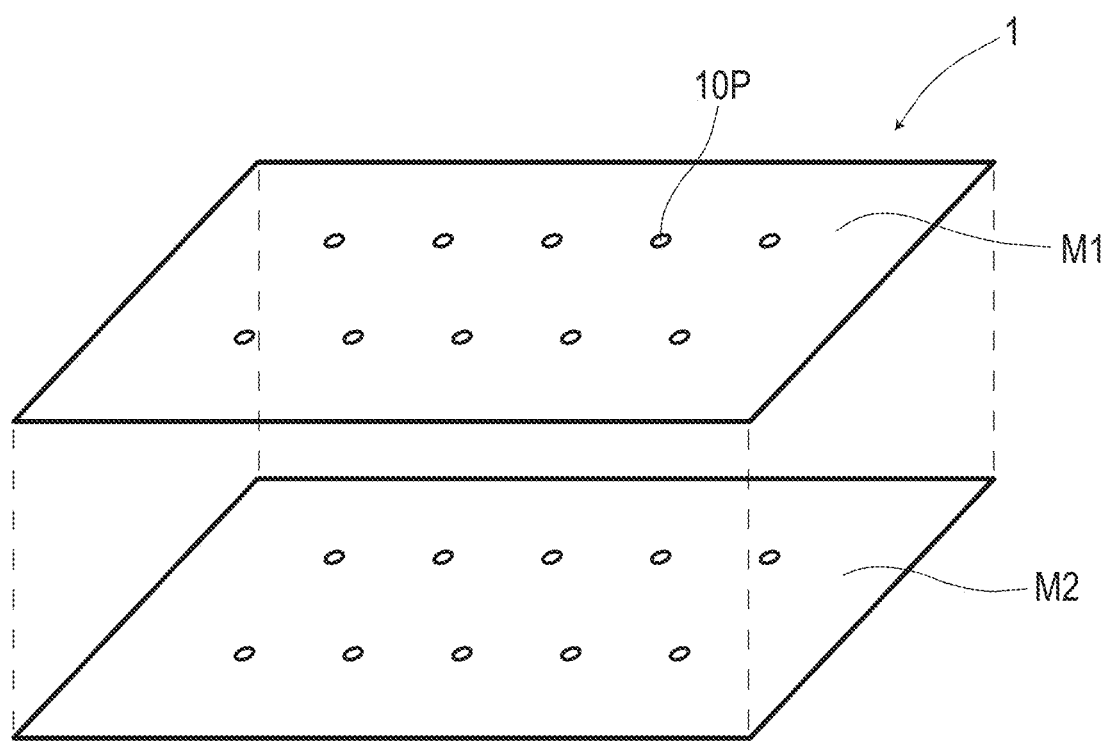
FIG. 17 is a descriptive diagram of a map in a fourth embodiment.

The present embodiment is an example based on the configuration of the second embodiment, in which the configuration of position data to be linked to structure map M1 and road-surface magnetic distribution M2 is changed. Details of this are described with reference to FIG. 17.

In the configuration of the second embodiment, as with the first embodiment, position data indicating an absolute position is linked to each point on structure map M1 and road-surface magnetic distribution M2. On the other hand, in structure map M1 and road-surface magnetic distribution M2 of the present embodiment, either of the position data indicating an absolute position and the position data indicating a relative position is linked to each point.

Of structure map M1 and road-surface magnetic distribution M2, position data indicating an absolute position is linked to marker arrangement point 10P, which is the position of the magnetic marker. In structure map M1 and road-surface magnetic distribution M2, position data indicating a relative position with reference to a nearby magnetic marker is linked to each point other than marker arrangement points 10P.

When collation is made between the position data indicating an absolute position and the position data indicating a relative position by taking a nearby magnetic marker as a reference position, the latter position data has a significantly smaller data size. In the map of the present embodiment, position data with a small data size indicating a relative position is linked to each of most points other than marker arrangement points 10P, and thus the data size of the entire map is suppressed small. At each point on the map other than marker arrangement points 10P, a relative positional relation with the reference position (position of a nearby magnetic marker) can be specified by information about the relative position indicated by the linked position data. Since the reference position allows its absolute position specified, based on this reference position, the absolute position of each point on the map can be specified.

In the vehicle (reference example) on a map using side, when it can be estimated that the own vehicle position is positioned at any point on the map, first, a relative position indicated by the position data linked to that point is acquired. Furthermore, in this vehicle, marker arrangement point 10P is obtained by shifting by that relative position on the map, and an absolute position indicated by the position data linked to marker arrangement point 10P is acquired. In the vehicle, by combining the absolute position of a magnetic marker serving as a reference and the relative position from that marker, the absolute position of the own vehicle position can be estimated.

Note that the other configurations and the operation and effects are similar to those in the second embodiment.

In the foregoing, while specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 map
10 magnetic marker (marker)
10P marker arrangement point
100 road (traveling road)
100S road surface
11 measuring vehicle
13 control unit
131 position estimation part
133 distribution allocation part
15 GPS unit
2 measuring unit
21 sensor array
212 detection processing circuit
5 vehicle
50 control unit
52 sensor array
Cn magnetic sensor
M1 structure map
M2 road-surface magnetic distribution

The invention claimed is:

1. A map data generation method of generating map data to be used by a vehicle which can measure magnetism acting from a road surface of a traveling road to estimate an own vehicle position, the method comprising processes of:
providing a structure map M1 representing at least a road structure and a road-surface magnetic distribution M2 in a blank state in which magnetic data is not associated therewith, the structure map M1 and the road-surface magnetic distribution M2 being associated with each other via position data indicating absolute positions to make respective positions in the road-surface magnetic distribution M2 uniquely correspond to respective positions in the structure map M1, thereby forming a layer data structure in which the structure map M1 and the road-surface magnetic distribution M2 mutually face each other, acquiring a position of a measuring vehicle which includes a magnetic sensor;

measuring magnetic data on the road surface with the magnetic sensor; and associating the magnetic data measured with the magnetic sensor with a point on the road-surface magnetic distribution M2 corresponding to the position of the measuring vehicle in a sequential manner as the measuring vehicle travels on the road surface, to make the road-surface magnetic distribution M2 represent a distribution of the magnetic data in a two-dimensional area on the road surface.

2. The map data generation method in claim 1, wherein a magnetic marker serving as a magnetism generation source is laid in the traveling road of the vehicle in a state in which an absolute position of the magnetic marker can be specified, and in the process of acquiring, the position of the measuring vehicle is acquired by specifying a relative position of the measuring vehicle with respect to the magnetic marker.

3. The map data generation method in claim 2, wherein two magnetic markers are arranged so as to be adjacent to each other along a predetermined direction in which an absolute azimuth can be specified, and in the process of acquiring, an azimuth of the measuring vehicle with respect to the predetermined direction in which the two magnetic markers are adjacent to each other is acquired.

4. The map data generation method in claim 1, further comprising:

a process of forming magnetic singular points by magnetizing the road surface paved with a pavement material having a magnetic material mixed therewith.

5. The map data generation method in claim 4, wherein the road-surface magnetic distribution M2 is configured to be able to be collated with a distribution of one-dimensional or two-dimensional magnetic data measured by the vehicle and to be able to specify a corresponding area with a high degree of matching with the distribution of the magnetic data, and the road-surface magnetic distribution M2 is configured to be able to be collated with the distribution of the one-dimensional or two-dimensional magnetic data by presuming coincidence of the magnetic singular points.

6. The map data generation method in claim 1, wherein the magnetic data includes magnetic gradients.

7. The map data generation method in claim 1, wherein the measuring vehicle includes a sensor array which has a plurality of magnetic sensors arrayed therein and can simultaneously acquire the magnetic data at a plurality of locations on the road surface, in the process of acquiring, in addition to the position of the measuring vehicle, an azimuth of the measuring vehicle is acquired, and in the process of associating, when associating the magnetic data at the plurality of locations acquired by the sensor array with corresponding points on the road-surface magnetic distribution M2 based on the position and the azimuth of the measuring vehicle, the distribution of the magnetic data at the plurality of locations is rotated on the road-surface magnetic distribution M2 by taking the position of the measuring vehicle as a center of rotation in accordance with the azimuth of the measuring vehicle, thereby specifying an posture of the distribution of the magnetic data at the plurality of locations in the road-surface magnetic distribution M2, and associating the distribution of the magnetic data at the plurality of locations with the road-surface magnetic distribution M2.

8. The map data generation method in claim 1, wherein in the road-surface magnetic distribution M2 in the blank state, while the magnetic data is not associated with each point, the road-surface magnetic distribution M2 is associated with the structure map M1 via the position data indicating the absolute positions, and the process of associating is performed in response to a performance of the process of measuring, and the magnetic data is sequentially linked to a corresponding point of the road-surface magnetic distribution M2.

9. The map data generation method in claim 1, wherein the road-surface magnetic distribution M2 is configured to be able to be collated with a distribution of one-dimensional or two-dimensional magnetic data measured by the vehicle and to be able to specify a corresponding area with a high degree of matching with the distribution of the magnetic data.

10. The map data generation method in claim 1, wherein the magnetic data forming the road-surface magnetic distribution M2 is data of a magnetic vector including information about a magnetic strength and an acting direction.

11. Map data usable for control for vehicle driving assist or vehicle automatic driving, comprising:

a structure map M1 representing at least a road structure; and a road-surface magnetic distribution M2 which is a distribution of magnetic data in a two-dimensional area on a road surface of a traveling road of a vehicle, wherein the structure map M1 and the road-surface magnetic distribution M2 are associated with each other via position data indicating absolute positions, thereby forming a layer data structure in which the structure map M1 and the road-surface magnetic distribution M2 mutually face each other, the traveling road has magnetic markers each serving as a magnetism generation source laid therein, and in the road-surface magnetic distribution M2, marker arrangement points indicating laying positions of the magnetic markers are plotted.

12. The map data in claim 11, wherein the road-surface magnetic distribution M2 includes at least a distribution of magnetic data at each point away from the road surface in a height direction.

13. The map data in claim 12, wherein the map data includes, as the distribution of the magnetic data, the road-surface magnetic distributions M2 of two kinds or more with different heights above the road surface.

14. The map data in claim 11, wherein the magnetic data includes magnetic gradients, and the road-surface magnetic distribution M2 is a distribution of the magnetic gradients.

15. The map data in claim 11, wherein in a state in which a reference magnetic marker can be specified, information indicating a relative position with respect to the reference magnetic marker is linked to each point on the map data.

16. The map data in claim 11, wherein the road-surface magnetic distribution M2 is configured to be able to be collated with a distribution of one-dimensional or two-dimensional magnetic data measured by the vehicle and to be able to specify a corresponding area with a high degree of matching with the distribution of the magnetic data.

17. The map data in claim 11, wherein
an equation representing a degree of attenuation of a magnetic strength in a height direction is associated with each position on the map data.

18. The map data in claim 11, wherein
the magnetic data forming the road-surface magnetic distribution M2 is data of a magnetic vector including information about a magnetic strength and an acting direction.

19. The map data in claim 11, wherein
on the map data, while the position data indicating the absolute positions is linked to the marker arrangement points, relative position data indicating a relative position with reference to a nearby marker arrangement point is linked to each point other than the marker arrangement points.

20. A map data generation method of generating, by using a measuring vehicle including a magnetic sensor, map data to be used by a vehicle which can measure magnetism acting from a road surface of a traveling road to estimate an own vehicle position, the method comprising:
a positioning process of acquiring a position of the measuring vehicle;
a magnetic measurement process of measuring magnetic data on the road surface with the magnetic sensor; and
an association process of associating the magnetic data measured in the magnetic measurement process with a point on the map data corresponding to the position of the measuring vehicle acquired in the positioning process, wherein
in the map data, a road-surface magnetic distribution M2, which is a magnetic distribution in a two-dimensional area, is associated with a structure map M1 representing at least a road structure, and the structure map M1 and the road-surface magnetic distribution M2 are associated with each other via position data indicating absolute positions,
the association process is a process of associating the magnetic data with a point in the road-surface magnetic distribution M2,
the measuring vehicle includes a plurality of magnetic sensors arranged along a vehicle-width direction of the measuring vehicle,
in the magnetic measurement process, the magnetic data on the road surface configuring one-dimensional magnetic distribution is measured by simultaneously acquiring magnetic measurement values with the plurality of magnetic sensors,
in the association process, the magnetic measurement values configuring the one-dimensional magnetic distribution are associated to respective points in a one-dimensional area in the road-surface magnetic distribution M2 with reference to the position of the measuring vehicle, and
the measuring vehicle is caused to travel along the road surface and a magnetic distribution of a band-shaped area along a path traveled by the measuring vehicle is allocated to the road-surface magnetic distribution M2 and the magnetic data is sequentially associated with points in the road-surface magnetic distribution M2.

* * * * *